(12) United States Patent
Larson

(10) Patent No.: US 7,364,663 B2
(45) Date of Patent: Apr. 29, 2008

(54) FILTER SYSTEM

(75) Inventor: Douglas Alan Larson, River Forest, IL (US)

(73) Assignee: Heritage-Crystal Clean, LLC, Elgin, IL (US)

(*) Notice: Subject to any disclaimer, the term of this patent is extended or adjusted under 35 U.S.C. 154(b) by 0 days.

(21) Appl. No.: 10/962,335

(22) Filed: Oct. 8, 2004

(65) Prior Publication Data

US 2005/0082238 A1 Apr. 21, 2005

Related U.S. Application Data

(62) Division of application No. 10/396,069, filed on Mar. 25, 2003, now Pat. No. 6,818,126.

(51) Int. Cl.
*B01D 17/02* (2006.01)
*B01D 36/04* (2006.01)

(52) U.S. Cl. .................... 210/799; 210/DIG. 5
(58) Field of Classification Search ............... 210/799
See application file for complete search history.

(56) References Cited

U.S. PATENT DOCUMENTS

| | | | |
|---|---|---|---|
| 3,067,504 A | 12/1962 | Lubben et al. | |
| 3,784,470 A | 1/1974 | Richardson et al. | |
| 5,114,582 A | 5/1992 | Sandstrom et al. | |
| 5,164,083 A * | 11/1992 | Ahrendt | 210/242.3 |
| 5,202,023 A | 4/1993 | Trimmer et al. | |
| 5,334,291 A * | 8/1994 | Gavlin et al. | 202/234 |
| 5,395,520 A | 3/1995 | Ito et al. | |
| 5,478,465 A * | 12/1995 | Larson et al. | 210/167 |

(Continued)

OTHER PUBLICATIONS

Defintion of "emulsion," taken from Hawley's Condensed Chemical Dictionary; pp. 460-461; Copyright 1987.*

*Primary Examiner*—Robert James Popovics
(74) *Attorney, Agent, or Firm*—Levenfeld Pearlstein, LLC; Mitchell J. Weinstein; Marc E. Fineman

(57) ABSTRACT

A filter system for receiving an oil-in-water emulsion contaminated with an emulsified contaminant oil, and separating the emulsified contaminant oil from the oil-in-water emulsion includes a filter media for receiving the oil-in-water emulsion and emulsified contaminant oil, having an inner filter element formed from a 95 percent single pass efficiency 48 micron (5 micron nominal) filtering material of needle punch polypropylene felt, an outer filter element formed from a 95 percent single pass efficiency 19 micron absolute filtering material of a polypropylene microfiber material and a porous spunbond polypropylene sandwiching the outer filter media. The filter element de-emulsifies the emulsified contaminant oil from the oil-in-water emulsion into the contaminant oil and the oil-in-water emulsion, separates the de-emulsified contaminant oil from the oil-in-water emulsion, coalesces the separated contaminant oil and passes both the coalesced de-emulsified contaminant oil and the oil-in-water emulsion. A first tank supports the filter element and is further configured to hold a quantity of the separated coalesced contaminant oil and the oil-in-water emulsion. The first tank has an overflow passing to a second tank. The second tank has an oil separation assembly for removing the oil-in-water emulsion from the contaminant oil and passing the oil-in-water emulsion therefrom. A method for separating the emulsified contaminant oil from the oil-in-water emulsion and recovering the oil-in-water emulsion is also disclosed.

4 Claims, 5 Drawing Sheets

U.S. PATENT DOCUMENTS

| | | | |
|---|---|---|---|
| 5,582,743 A * | 12/1996 | Larson et al. | 210/804 |
| 5,626,758 A | 5/1997 | Belfort | |
| 5,639,365 A | 6/1997 | McLoughlin et al. | |
| 5,965,015 A * | 10/1999 | Ronan et al. | 210/87 |
| 6,004,470 A * | 12/1999 | Abril | 210/776 |
| 6,039,870 A | 3/2000 | Gollan | |
| 6,066,264 A * | 5/2000 | Ronan et al. | 210/776 |
| 6,071,420 A * | 6/2000 | Martinsen | 210/774 |
| 6,123,838 A * | 9/2000 | Grossman | 210/97 |
| 6,203,707 B1 * | 3/2001 | Hartmann | 210/650 |
| 6,322,694 B1 * | 11/2001 | Iliadis et al. | 210/167 |
| 6,331,248 B1 | 12/2001 | Taniguchi et al. | |
| 6,391,198 B1 * | 5/2002 | Porter et al. | 210/241 |
| 6,818,126 B2 * | 11/2004 | Larson | 210/168 |
| 7,300,575 B2 * | 11/2007 | Larson | 210/167.04 |
| 2003/0178377 A1 * | 9/2003 | Larson | 210/799 |
| 2005/0082238 A1 * | 4/2005 | Larson | 210/799 |
| 2005/0279717 A1 * | 12/2005 | Larson | 210/799 |

* cited by examiner

FILTER SYSTEM

CROSS-REFERENCE TO RELATED APPLICATION DATA

This application claims the benefit of priority of U.S. Provisional patent Application Ser. No. 60/367,441, filed Mar. 25, 2002.

BACKGROUND OF THE INVENTION

The present invention is directed to a particle filtration, oil de-emulsifying, oil coalescing and oil collecting system. More particularly, the present invention is directed to a particle filtration, oil de-emulsifying, oil coalescing and oil collecting system that uses a needle punch polymer primary filter and a microfiber polymer secondary filter in a coiled tubular arrangement.

Devices, systems and methods for the removal of particles, free oil (such as dispersed, finely divided oil droplets), and emulsified oil contaminants in aqueous fluids is in widespread use in all types of commercial and industrial facilities. Known devices include cartridge and bag filters either permanently installed or as a part of portable systems, conventional oil coalescing systems that require many stages, baffles, filters, and weirs to coalesce and then separate and accumulate the coalesced oil, membrane filtration systems that concentrate emulsified oils and particles in an aqueous fluid for disposal, and conventional oil skimmers that remove oils in aqueous fluid sumps or baths after the oil droplets begin to coalesce due to time and gravity. Known methods include periodically pumping out the old fluid and pumping in new coolant However, each of these known systems has its drawbacks. For example, cartridge and bag filters are subject to blinding by oil emulsions and contaminants and require high pressure pumps and housings. Oil coalescing systems are relatively expensive and difficult to clean and usually require a relatively large dedicated floor space, and do not remove emulsified tramp oils.

Membrane filters are unreliable due to their sensitivity to fouling by various contaminants and damage by pH and temperature. Membrane filters remove coalesced oils by holding back the oil and allowing aqueous fluids to pass through the filter. This concentrates the emulsion on one side of the membrane. As the concentration of oil increases, the efficiency of the filtration system decreases (due to increased resistance across the membrane) and the membrane becomes increasingly susceptible to fouling.

Periodic change-out of the coolant results in labor time and costs, machine down-time, coolant costs and disposal costs. Moreover, once the coolant is changed, it begins accumulating unwanted contaminants such that the quality of the coolant continually degrades until the next change-out.

Various attempts have been made to reduce fouling in membrane filters. These include using spinning discs near the surface of the membrane; however, these disks require relatively large amounts of energy and generate heat in the fluid. Moreover, membrane pore sizes are such that bacteria concentrates with the emulsion. The heat generated from the antifouling mechanisms tends to colonize bacteria and create offensive odors. Further, membrane filtration systems cannot be used to filter emulsified oil coolants for reuse because the membrane blinds (clogs or fouls) when it is used to filter out finely divided oil-in-water emulsions.

With respect to oil-in-water emulsions, these are liquid systems that are particularly difficult to filter. Such liquid systems include, for example, coolant systems having a (desired) oil droplet "surrounded" by coolant. That is, the oil-in-water forms a micelle-like liquid system with a desirable oil in the nucleus of the micelle and the coolant surrounding the oil nucleus. The "desirable" oil may be, for example, a particular lubricating oil. In such systems, tramp oils such as (other, undesirable) lubricating oils, hydraulic fluids and part coating oils (collectively contaminants) maybe present in the coolant system. These contaminants adhere or attach to the outer liquid of the system. It is these contaminants that must be removed, without removing the desirable oils.

Oil skimmers are essentially a remediation strategy to remove unwanted oils after they have become a problem. Floating oils typically prevent the movement of oxygen and create an environment for the cultivation of anaerobic bacteria. Floating oils can also form dry floating patches of material that are not effectively picked up by conventional skimming techniques. However, oil skimmers do not remove emulsified tramp oils. The emulsified oils can also become food to cultivate bacteria as well as change the cooling and machining enhancement properties of the coolant.

Accordingly, there is a need for a filter system that is less susceptible to fouling and that can remove unwanted contaminants. Desirably, such a filter system is configured to allow contaminants to first pass over a used area of the filter prior to exposing the contaminants to unexposed areas of the filter. Most desirably, such a filter system increases the ability of oil and particulate contaminants to be removed without prematurely blinding the filter media. Such a system most desirably operates at low pressure differentials to promote high efficiency and to eliminate the need for high pressure pumps and additional structural elements to support these higher operating pressures.

BRIEF SUMMARY OF THE INVENTION

A filter system for receiving an oil-in-water emulsion contaminated with an emulsified contaminant oil, and separating the emulsified contaminant oil from the oil-in-water emulsion includes a filter media for receiving the oil-in-water emulsion and emulsified contaminant oil. The filter media has an inner filter element formed from a 5 micron nominal, 48 micron 95 percent efficiency single pass filtering material of needle punch polypropylene felt, an outer filter element formed from a 19 micron 95 percent efficiency single pass filtering material of a polypropylene microfiber material and a porous spunbond polypropylene surrounding the outer filter media.

The filter element de-emulsifies the emulsified contaminant oil from the oil-in-water emulsion into the contaminant oil and the oil-in-water emulsion, coalesces the de-emulsified contaminant oil, separates the coalesced de-emulsified contaminant oil from the oil-in-water emulsion, and passes both the coalesced de-emulsified contaminant oil and the oil-in-water emulsion.

A first tank supports the filter element, The first tank is further configured to hold a quantity of the coalesced de-emulsified contaminant oil and the oil-in-water emulsion. The first tank includes an overflow passing to a second tank.

The second tank has an oil separation assembly for removing the oil-in-water emulsion from the contaminant oil and passing the oil-in-water emulsion therefrom. In a present system, the oil separation assembly includes a vertical conduit extending to about a bottom of the tank and a tee in flow communication with the vertical conduit. The tee provides flow communication from the second tank such that the oil-in-water emulsion flows upward into the vertical conduit, into the tee and out of the second tank. The lighter coalesced oil, however, floats on top of the oil-in-water emulsion in the second tank and is precluded from exiting the second tank until the oil depth exceeds the depth of the vertical conduit.

Preferably, the oil-in-water emulsion is recovered and reused. The contaminant oil is also recovered for subsequent treatment and/or disposal.

The filter system can include an over-pressurization arrangement to prevent over-pressurizing the filter media.

In a present filter system, an optional pre-separation system is disposed prior to the first tank. The pre-separation system separates contaminant oil (e.g., tramp oils "floating" on the surface) from the oil-in-water emulsion that is contaminated with the emulsified contaminant oil. A present separation system is a belt skimmer.

A method for separating an oil-in-water emulsion from a liquid system having an oil-in-water emulsion contaminated with an emulsified contaminant oil includes the steps of introducing the oil-in-water emulsion contaminated with the emulsified contaminant oil through a filter media to form an oil-in-water emulsion and a separated contaminant oil stream, passing the oil-in-water emulsion through the filter media, passing the contaminant oil through the filter media, separating the oil-in-water emulsion from the contaminant oil and recovering the oil-in-water emulsion.

The present systems use the natural ability of the coiled tubular filter configuration to de-emulsify and coalesce oils and makes use of gravity to facilitate separating and accumulating the coalesced oils, in a container, for ease of removal. A present system can be provided in a modular design having a relatively small footprint, which provides a cost effective, machine-dedicated system for example, for parts cleaners, machine tools and the like. Moreover, the present coalescing/de-emulsifying coiled tubular filter system is less susceptible to fouling and bacteria colonization than membrane filters because the coalesced oil, aqueous fluid, and any bacteria pass through the filter.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1B:
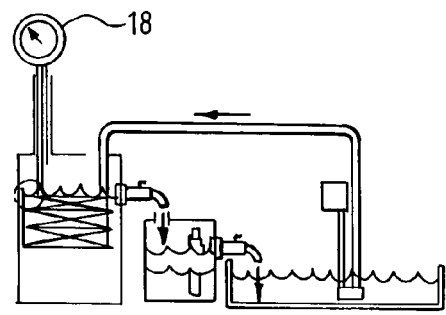
FIG. 1B illustrates an exemplary arrangement for use of the filter system.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 1A:
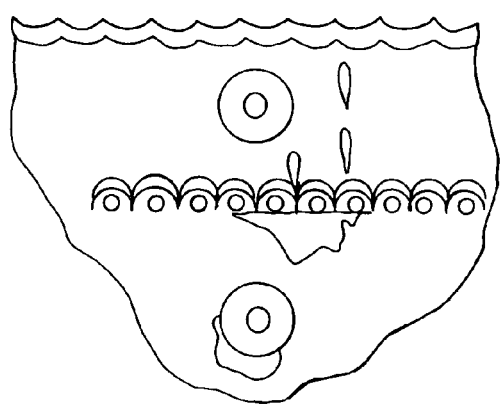
FIG. 1A illustrates the phenomena of de-emulsifying, filtration and coalescing as carried out by the present filter system.
Figure 2:
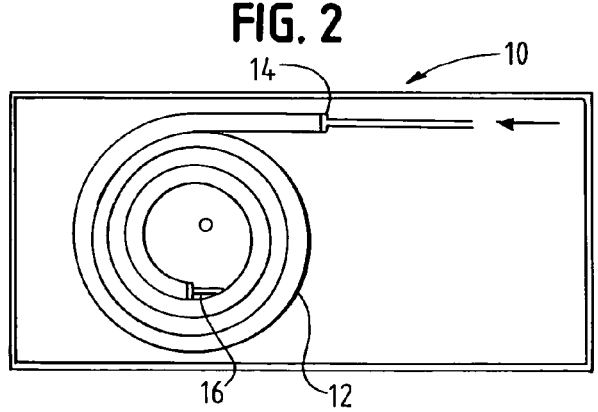
FIGS. 2 and 3 are plan and elevational views of one embodiment of the coalescing/de-emulsifying coil tubular filter embodying the principles of the present invention.
Figure 3:
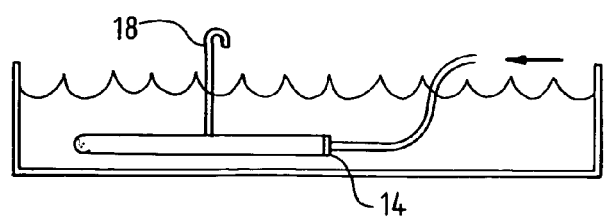

Referring now to the figures, and in particular to FIGS. 1B, 4, 6 and 11, there is shown a one embodiment of a coalescing/de-emulsifying coiled tubular filter system 10. The system 10 is configured to receive a contaminated liquid stream, such as an oil-in-water emulsion, de-emulsify the contaminants from the emulsion and pass both the contaminants and the emulsion through a filter 12, such that the contaminants and the emulsion remain separated from one another with the contaminants being coalesced and passed as seen in FIG. 1A.

The coalescing/de-emulsifying coiled tubular filter system 10 includes the coiled tubular filter 12 media having an inlet fitting 8 and an outlet fitting 16 connected to the tubular filter 12 media at each end. The fittings 8, 16 can be connected by, for example, conventional hose clamps. The inlet fitting 8 connects the coiled tubular filter 12 to the fluid to be filtered. The outlet fitting 16 connects a filter change indicator 18 which is formed from of a length of tubing having an open end elevated a predetermined distance above the filtered fluid. Optionally, and preferably, a pressure gauge and bypass and/or relief valve is used. The change indicator 18 provides a controlled backpressure to the filter 12, a visual and measurable indicator of backpressure, and a bypass to maintain fluid flow and prevent over pressurizing the filter element. Again, optionally and preferably, a pressure gauge and bypass is used to prevent over-pressurization.

Figure 4:
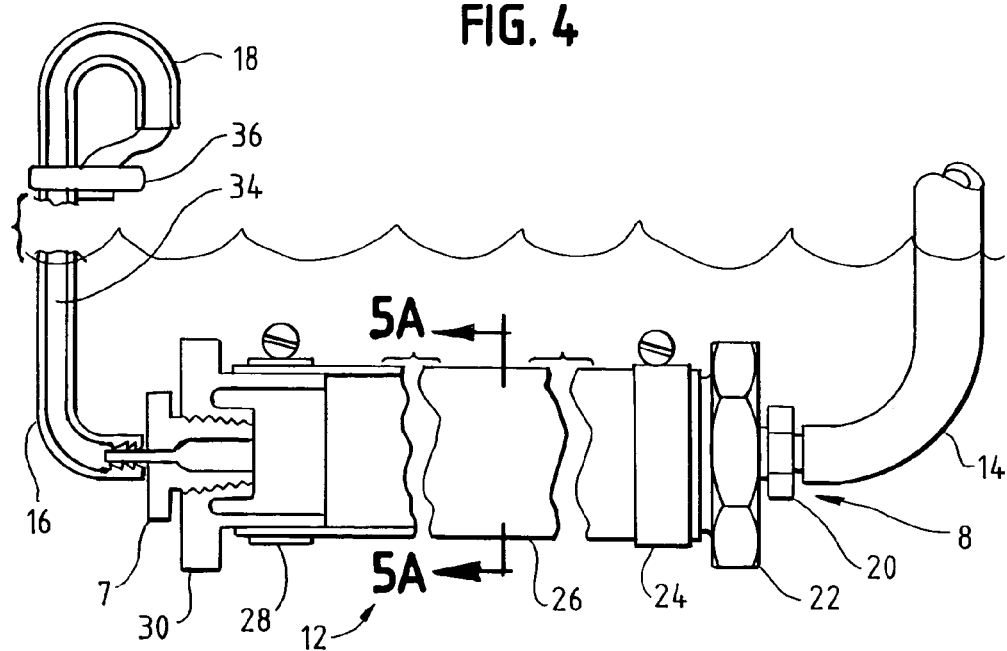
FIG. 4 is a partial view of the filter system illustrating one way in which the filter media can be connected to the overall system.

Referring to FIG. 4, the coalescing/de-emulsifying coiled tubular filter 12 includes an inlet hose 14, hose to thread adapter 20, thread to pipe adaptor 22, inlet hose clamp 24, tubular filter material 26, outlet hose clamp 28, outlet pipe to thread adaptor 30, outlet thread to hose adapter 7, bypass pressure relief tube 34, and bypass pressure relief opening 36. Preferably, as set forth above, instead of the tube 34 and opening 36 arrangement, a pressure gauge and relief valve (not shown) are used to prevent system 10 over-pressurization. A cross-sectional view of the filter shown in FIG. 5B illustrates the normal shape of the tube filter 12 as a collapsed flat. The tube 12 is made by folding one or more strips of material or materials and either heat sealing or sewing the edges 38 to one another. FIG. 5C shows an alternate construction in which two strips of material are either heat sealed or sewn along both edges 38a and 38b. The double edge construction provides a stronger bias to maintain the two surfaces of filter material together.

Figure 5A:
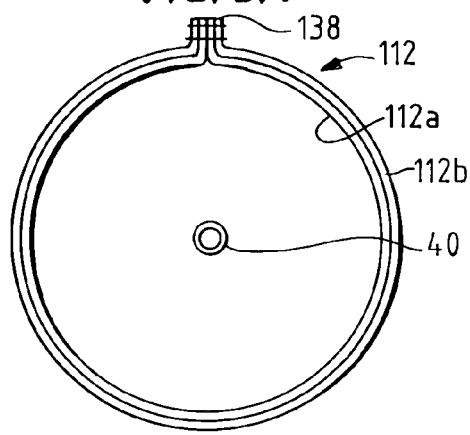
FIGS. 5A-5E are still other views of the filter illustrated in cross-section and showing various alternate seam arrangements.
Figure 5B:
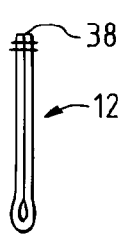
Figure 5C:
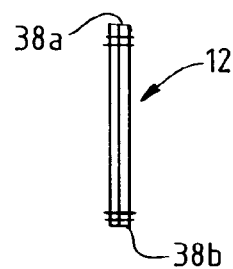

FIG. 5A illustrates a cross-sectional view of one embodiment of the coalescing/de-emulsifying coiled tubular filter 112. The filter 112 is formed having an inner filter 112a and an outer filter 112b. In a current embodiment, the inner filter 112a is fabricated from a 48 micron 95 percent efficiency single pass (5 micron nominal) needle punch polypropylene material, and the outer filter 112b is made out of a 19 micron 95 percent efficiency single pass microfiber polypropylene that is sandwiched between layers of spunbond polypropylene to retain any loose microfibers. The layers of filter media 112a, 112b are formed into a tubular configuration by joining the longitudinal edges 138 to one another and forming a seam. In the present embodiment, the seam is a standard industrial sewn seam. However, other seaming methods such as gluing, ultrasonic welding, vibratory friction welding, heat welding and the like are contemplated. An exemplary microfiber material is commercially available from AET Specialty Nets & Non-Woven of Middletown, Del. The outer filter inner and outer covers are spunbond polypropylene commercially available as Snopro 8 and Snopro 20, respectively, from Snow Filtration of West Chester, Ohio. The materials are ½ ounce and 2 ounce weight, respectively.

Figure 5D:
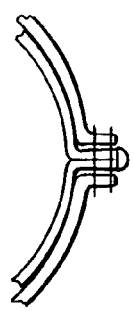
Figure 5E:
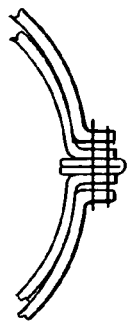

FIGS. 5D and 5E illustrate still other alternate seam seals that are used to prevent leakage through the seam holes. When the filter 12, 112 becomes pressurized the forces are such that the seam threads may start to elongate the thread holes, thus creating a small leak path. FIG. 5E shows an embodiment in which the seam seal is a triple folded strip of polyethylene film (about 6 mil ($6/1000$) inch thick) that is sandwiched between the two layers of the inner filter. FIG. 5D shows an embodiment in which a strip of polyethylene is wrapped over the seam of the inner filter. In both embodiments, the seal strip material is sufficiently elastic to seal around the seam threads. The strips are located such that they "float" and are unaffected by the stresses in the filter media when the filter becomes pressurized.

In a present embodiment, the coalescing/de-emulsifying coiled tubular filter 12, 112 has ¼" ID×⅜" OD high density polyethylene (HDPE) tubing 40 running almost all of its length. The filter tubing 40 is approximately 8" shorter than the coalescing/de-emulsifying tubular filter 12 media to allow for the attachment of the inlet fitting 8 and outlet fitting 16. In the preferred embodiment, the filter tubing 40 has a natural coiled shape to impart a coiled shape to the coiled tubular filter 12 media. The filter tubing 40 also prevents the coiled tubular filter 12 media from kinking. The inner filter 112a removes particles and absorbs free floating oils to prevent premature blinding of the much finer outer filter 112b.

The inner filter 112a has a 95 percent single pass filtration efficiency of 48 microns and the outer filter 112b has a 95 percent single pass filtration efficiency of 19 microns. Finally, the outer filter 112b is made out of a material capable of adsorbing and coalescing water-in-oil emulsions (dark colored fluids) while passing oil-in-water emulsions (milky colored fluids).

Figure 6:
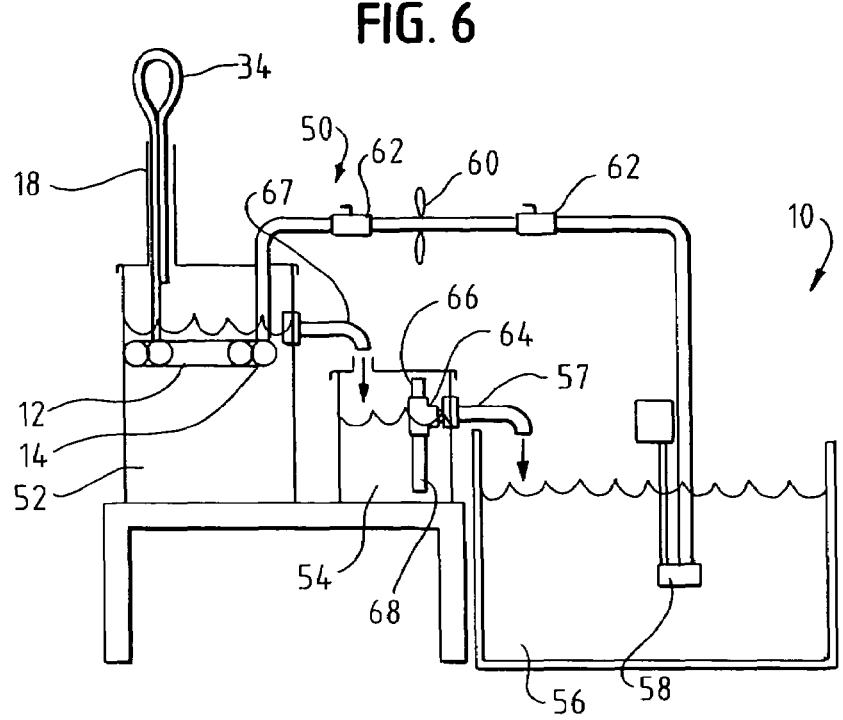
FIG. 6 illustrates the de-emulsifying/coalescing coil tubular filter used in a dialysis configuration.

FIG. 6 illustrates a dialysis configuration 50 of the coalescing/de-emulsifying coiled tubular filter system 12, 112. The dialysis configuration 50 is typically the configuration that is used for filtering particles and de-emulsifying and coalescing unwanted emulsified oils in a coolant sump and parts cleaning systems. The dialysis configuration 50 includes a coalescing tubular filter reservoir 52 that houses the coalescing/de-emulsifying coiled tubular filter 12 and that empties into an oil/water separator reservoir 54. The fluid in the oil/water separator reservoir 54 passes through an oil trap back to the fluid reservoir 56 containing the fluid being filtered. In a present embodiment, the filter reservoir 52 and the oil/water separator 54 are 6-gallon containers. The oil/water separator 54 is a translucent plastic material to provide visual indication of the level of any floating oil and accumulated sediment inside.

A pump 58 in the fluid reservoir delivers fluid to the inlet end 14 of the coalescing/de-emulsifying coiled tubular filter through a flow restrictor 60 and a shutoff valve 62. The flow restrictor 60 is used to establish a desired flow rate. The shutoff valve 62 is used to stop flow to the coalescing/de-emulsifying coiled tubular filter 12 during change-out or maintenance of the filter 12 media. The pump 58 can be a dedicated pump. Alternately, the fluid can be split from a machine fluid recirculating system, such as a parts cleaner fluid, machine tool coolant, or the like.

Fluid that is pumped into the deemulsifying/coalescing coiled tubular filter 12 passes through the deemulsifying/coalescing tubular filter media which traps particles, absorbs oils, and de-emulsifies and coalesces water-in-oil emulsions, while passing the desired oil-in-water emulsions. The coalesced oil from the coalescing/de-emulsifying tubular filter media overflows into the oil/water separator 54 where the oil is trapped by the oil trap 57 and the aqueous fluid passes on to the fluid reservoir 56. The oil trap 57 consists of a tee fitting 64 with an upper pipe 66 and lower pipe 68. The upper pipe 66 acts as a vent to prevent the fluid in the oil/water separator 54 from being siphoned into the fluid reservoir 56. The lower pipe 68 prevents floating oil from passing into the fluid reservoir 56. The filter change indicator 18 shows whether the tubular filter media needs to be changed. As the coalescing/de-emulsifying tubular filter 12, 112 media begins to blind, fluid rises in the filter change indicator providing a backpressure to help force fluid through the coalescing/de-emulsifying tubular filter 12, 112 media. Higher elevation of the filter change indicator 18 provides a higher backpressure that can be achieved before the fluid exits the change indicator tube 34 into the filtered fluid. The fluid change indicator 18 helps to assure that the coiled tubular filter 12, 112 media is optimally used prior to changeout. A pressure gauge and relief valve (not shown) can be used to monitor pressure in the filter system 10 and to prevent over-pressurization of the system 10. As necessary, the filtration system 10 may be raised to allow gravity flow back to the fluid reservoir 56.

Figure 7:
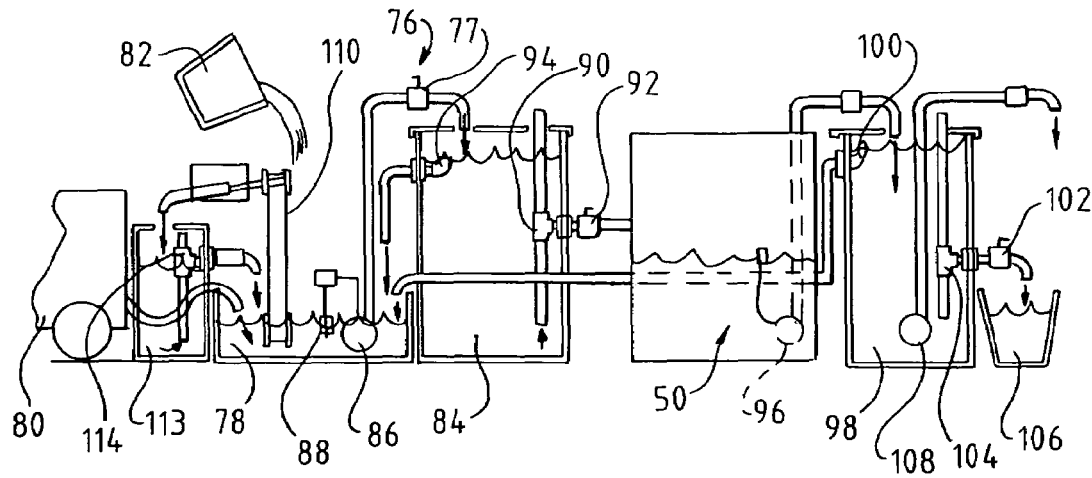
FIG. 7 illustrates the de-emulsifying/coalescing coil tubular filter used in a recirculating reuse configuration.

FIG. 7 illustrates a recirculating reuse configuration 76 that includes a dirty fluid reservoir 78 that collects dirty fluid from sources such as floor cleaning machines 80, mop buckets 82, or any other aqueous process waste requiring removal of particulate and emulsified oils. The fluid in the dirty fluid reservoir 78 is transferred into the oil/water separator reservoir 84 by, for example, a pump 86 which is controlled by a dirty fluid level switch 88 and flow control valve. The fluid in the oil/water separator reservoir 84 passes through an oil/water separator oil trap 90, through a flow control valve 92, into the coalescing/de-emulsifying coiled tubular filter 12, 112 inside the filter container, which is exemplified by the dialysis system 50 configuration. Fluid in the oil/water separator reservoir 84 also overflows any accumulated floating oil back to the dirty fluid reservoir 78 via an oil/water separator reservoir overflow 94.

The fluid in the coalescing/de-emulsifying coiled tubular filter system 50 passes through the walls of the coalescing/de-emulsifying tubular filter 12, 112 media which traps particles, absorbs oils, and de-emulsifies and coalesces water-in-oil emulsions as provided above. The oil coalesced by the tubular filter 12, 112 media overflows to the oil/water separator 54 via the coalescing coiled tubular filter container overflow 67. Referring to FIGS. 6 and 7, the filtered fluid pump 96 (which replaces pump 58) transfers filtered fluid from the transfer container 56 to the filtered fluid reservoir 98. A filtered fluid level switch turns off the filtered fluid pump 96 when the fluid level drops below a preset level.

A flow control valve controls the rate of transfer of filtered fluid from the transfer container 56 to the filtered fluid reservoir 98. Excess fluid in the filtered fluid reservoir 98 returns to the dirty fluid reservoir 78 by way of a filtered fluid reservoir overflow 100. The filtered fluid reservoir overflow 100 provides continuous recirculation to aerate the liquid. Aeration reduces the opportunity for bacterial growth and the overflow 100 returns any additional oil separation in the filtered fluid reservoir to the dirty fluid reservoir. A drain valve 102, connected to a filtered fluid oil trap 104, is used to dispense filtered fluid into a mop bucket 106. A filtered fluid reservoir pump 108 with a shutoff valve and electrical on/off switch is used to dispense filtered fluid into floor cleaning machines.

The oil that accumulates in the dirty fluid reservoir 78 is removed by a belt skimmer 110 that transfers the oil into the used oil reservoir 113. Any dirty aqueous fluid picked up by the belt skimmer 110 is returned to the dirty fluid reservoir 78 through an oil trap 114. The oil trap has a lower tube which prevents oil from flowing into the dirty fluid reservoir. The oil trap has an upper tube that is a vent to prevent siphoning. A fluid change indicator 18 or pressure gauge and bypass can be used to monitor system pressure and to prevent over-pressurization of the system.

The present configuration provides that any oils that are separated in any of the containers (oil/water separator reservoir 84 and filtered fluid reservoir 98) are automatically returned to the dirty fluid reservoir 78 where the belt skimmer 110 transfers the oil into the used oil reservoir drum 112 for easy removal. If necessary, a biocide such as a 0.1% solution of Proxyl GXL is used to prevent bacteria growth.

Figure 8:
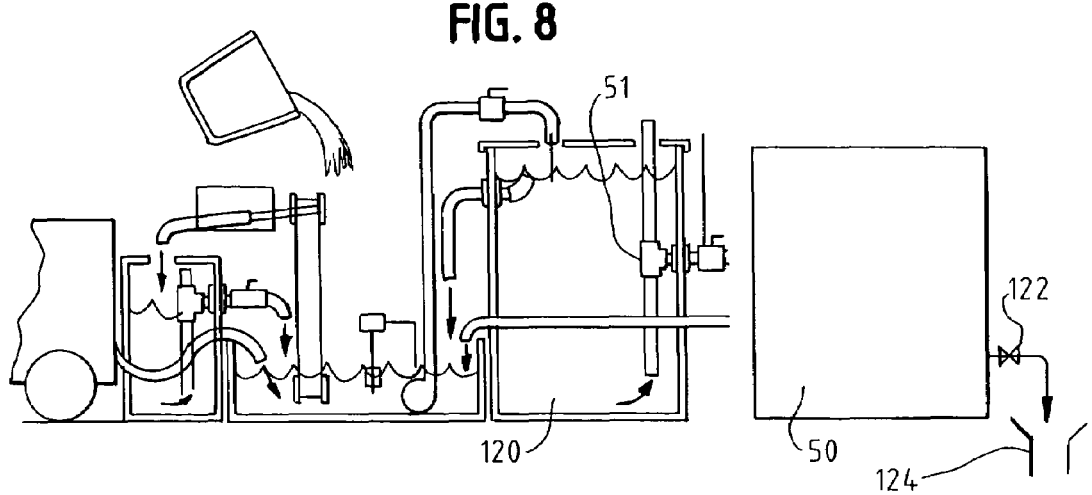
FIG. 8 illustrates the de-emulsifying/coalescing coil tubular filter is used in a recirculating discharge configuration.

FIG. 8 illustrates an embodiment of the coalescing/de-emulsifying coiled tubular filter system, again, exemplified by the system configuration 50, in which processing of waste water, such as mop water, is carried out for subsequent discharge to, for example, a sanitary sewer for further processing at a local Publicly Owned Treatment Works (POTW). Typically, POTW's have discharge concentration limits in the 250-500 mg/l range for fats, oils, and greases (FOG) usually requiring processing of waste waters from floor cleaning prior to discharge to the sanitary sewer. The inline configuration for discharge is similar to the configuration shown in FIG. 7, the filtered fluid reservoir and related components have been eliminated. In FIG. 8 it can be seen that the dirty fluid in the oil/water separator reservoir 120 passes through the filtration system (see FIG. 6) before passing through a discharge valve 122 to the sewer 124. The oil/water separator reservoir 120 has an oil trap 51 that includes a lower tube with an opening near the bottom of the oil trap canister to prevent floating oil from being discharged to the sewer. The oil trap 51 also has a vent to prevent siphoning fluid from the oil/water separator reservoir 120.

Figure 9:
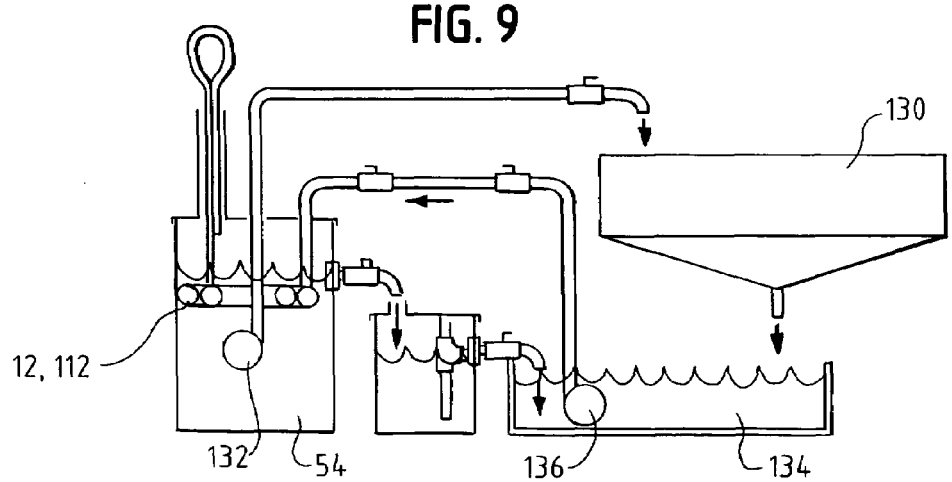
FIG. 9 illustrates the de-emulsifying/coalescing coil tubular filter used in a dialysis and recirculating configuration.

FIG. 9 illustrates an embodiment of the coalescing/de-emulsifying coiled tubular filter system again exemplified by the system configuration 50, that provides continuous dialysis filtration, similar to that of FIG. 6 while recirculating filtered fluid back to the process from where the fluid is supplied. A vibratory finishing process 130 is illustrated as but one exemplary process, however, other processes such as parts cleaning and the like that can uses such a system will be recognized by those skilled in that art. The function of the various components in the dialysis mode of filtration 50 is the same as that described in reference to the dialysis configuration above shown in FIG. 6. FIG. 9 shows that an inline function is achieved through the addition of a filtered fluid pump 132 in the filter canister 54 (see FIG. 6) and a flow control on an end of a hose that returns the filtered fluid to the exemplary vibratory finishing machine 130. The vibratory finisher 130 drains into the dirty fluid reservoir 134 to complete the fluid circuit. The dialysis mode flow rate is the difference between the sump pump 136 flow rate into the coalescing/de-emulsifying tubular filter 12, 112 and the return flow rate through the flow control back to the vibratory finisher 130.

Figure 10:
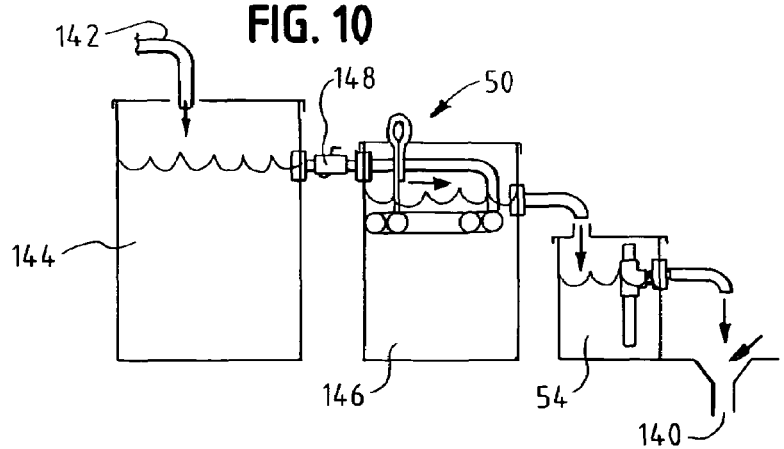
FIG. 10 illustrates the de-emulsifying/coalescing coil tubular filter used in an inline discharge configuration.

FIG. 10 shows an embodiment of the coalescing/de-emulsifying coiled tubular filter 12, 112 that is used to process fluid in a single pass for discharge to a sanitary sewer 140 for further processing by, for example, the local POTW. A typical application is processing air compressor condensate which can contain significant amounts of oil in excess of POTW discharge limits. A waste fluid stream 142 enters the accumulation drum 144. Fluid in the accumulation drum 144 overflows into the coalescing tubular filter reservoir 146 (see also 52 in FIG. 6) through a shutoff valve 148. Operation is identical to that described above in reference to the dialysis configuration illustrated in FIG. 6, except that there is no recirculating pump circuit and associated components (flow restrictor and shutoff valve), and the output through the outlet on the oil/water separator reservoir 54 discharges to the sewer 140 rather than back to the fluid reservoir. In the event that the coiled tubular filter blinds before changeout, the change indicator will go into a bypass mode.

Figure 11:
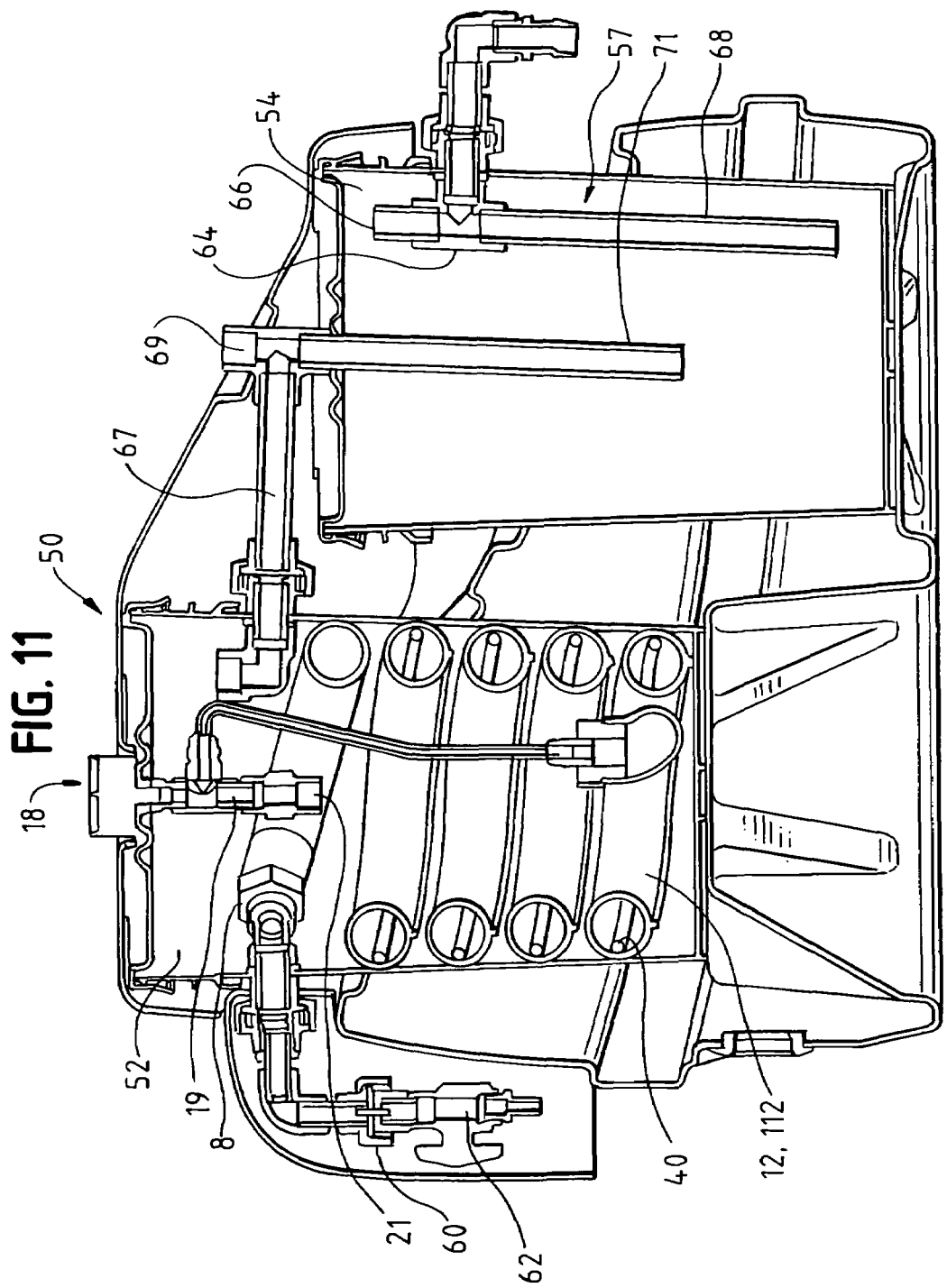
FIG. 11 illustrates a portable, compact, filly contained embodiment of the filter system of the present invention.

FIG. 11 illustrates one embodiment of the filter system 10 that is configured as a compact, self-contained unit 50. The filter system, 10 includes the coiled filter 12 present in the filter reservoir 52. The flow restrictor 60 and shut-off valve 62 are positioned at about an inlet of the reservoir 52. The coalesced oil from the coalescing/de-emulsifying tubular filter overflows into the oil/water separator 54 through overflow 67 where the oil is trapped by the oil trap 57. The oil trap 57, as set forth above, includes a tee fitting 64 with an upper pipe 66 and lower pipe 68. The upper pipe 66 acts as a vent to prevent siphoning fluid from the oil/water separator 54. The lower pipe 68 prevents passage of floating oil. The filter change indicator 18 includes a pressure gauge (e.g., 0-5 psig) which shows whether the tubular filter media needs to be changed. As the coalescing/de-emulsifying tubular filter 12, 112 media begins to blind, fluid pressure rises providing a backpressure to help force fluid through the filter 12, 112 media. A bypass valve 19 vents fluid into the reservoir 52 through opening 21 when the pressure in the filter exceeds a predetermined set point (e.g., about 2 psig). The coiled filter 12, 112 is still de-emulsifying, coalescing and filtering, because emulsified oil and particles are required to traverse the complete length of the filter before being able to exit through the bypass opening 21.

The overflow from the reservoir 52 to the separator includes a downwardly extending standpipe 71 and a vent 69. The standpipe opens at a level below the outlet of the oil trap to prevent splashing and re-emulsifying of the oil in the oil-in-water emulsion.

The above-described configurations optimize the features of the coalescing/de-emulsifying coiled tubular filter configuration by providing a flow path which continually skims off any coalesced oils and deposits them in a location and form for easy removal during service. The exemplary illustrated configurations use low flow rate, low pressure drop, multiple pass filtration configurations, which are more efficient in removing particles and emulsified oils than known high flow rate, high pressure drop, single pass filtration systems.

The present configurations operate on the principle that waste streams such as soluble oil coolants, aqueous parts cleaning fluids, vibratory finishing systems, used mop water, and air compressor condensate have the ability to loosely emulsify oils from machine lubrication systems, cutting/forming oils from previous machining operations, hydraulic oils, etc. By continually de-emulsifying, coalescing and removing the unwanted loosely emulsified oils, the quality of the process fluid is continually maintained for reuse or proper discharge to the sewer. Furthermore, by continually removing emulsified oils in the fluid, the loosely emulsified oils are not allowed to accumulate in the fluid and later separate out when not in use. It is also important to note that stagnant layers of oil on top of aqueous fluids prevent oxygen from coming into contact with the aqueous fluid. This provides an environment for the buildup of anaerobic bacteria often associated with rancid or foul smells.

The proposed coalescing/de-emulsifying filter uses a polymer, such as polypropylene, that has a surface tension that wets (adsorbs) oils and repels water. A filter media of many fine fibers of polypropylene therefore provides a good surface to de-emulsify and coalesce oils from droplets of aqueous fluid that have oil on the outside and water on the inside (water-in-oil emulsions). These characteristics are often associated with unwanted oils picked up by aqueous solutions such as coolants and air compressor condensates. Likewise, such a filter media passes aqueous fluids that have oil on the inside and water on the outside (oil-in-water emulsions) often associated with stable soluble oil coolants (milky white in color) and semi-synthetic coolants (cloudy in color). In this manner the filter, coupled with low shear stresses due to low pressures and velocities, can effectively remove unwanted oils from fluids without removing the desired soluble oils such as those found in coolant formulations.

It has been found that the present configurations use the natural ability of the polypropylene coiled tubular filter configuration to de-emulsify and coalesce oils and makes use of gravity to facilitate separating and accumulating the coalesced oils, in a container, for ease of removal. A present system can be provided in a modular design having a relatively small footprint, which provides a cost effective, machine-dedicated system for example, for parts cleaners, machine tools and the like. Moreover, the present coalescing/de-emulsifying coiled tubular filter system is less susceptible to fouling and bacteria colonization than membrane filters because the coalesced oil, aqueous fluid, and any bacteria pass through the filter.

Without being held to the specifics of the phenomena occurring, it is believed that the microfiber of the filter material strips off the emulsified oil from the oil-in-water micelle by adsorbing the oil onto the tiny fibers. The adsorbed oil then gradually coalesces and migrates through the filter media forming droplets on the outer surface of the filter media which eventually release and float to the surface. The oil coated microfibers also provide a good "sticky" surface for adhering small particles (smaller than the 19 micron 95 percent filtration efficiency of the microfiber filter material). The small particles entrained in the oil also migrate with the oil and become trapped in the subsequently coalesced oil droplets which are eventually separated out from the oil-in-water desirable emulsion. As such, it has been found that the present filtration system efficiently removes particles smaller than the rated filtration efficiency of the microfiber filter media. In addition, because the small particles are trapped by, and migrate with, the de-emulsified oil, the particles do not accumulate in the filter and therefore do not decrease the filter life.

Advantageously, it has been found that the present filter system does not significantly raise the temperature of the fluid. Oil de-emulsifying and coalescing followed by cascade oil trap separation separates the coalesced oils from the aqueous fluid rather than concentrates the separated emulsion. During routine service the only waste materials generated are accumulated oil and filter element. The proposed coalescing/de-emulsifying coiled tubular filter can effectively coalesce unwanted oil present in water-in-oil emulsions without breaking down desirable oil-in-water emulsions found in soluble oil and semi-synthetic coolants. It has also been found that the present coalescing/de-emulsifying coiled tubular filtration systems continuously removes emulsified tramp oils as they are forming, to eliminate the accumulation of unwanted oils in an aqueous fluid sump or bath. By removing unwanted oils as they are introduced, the unwanted cumulative effects, such as colonization of anaerobic bacteria, caked floating scum, food for general bacteria, and degradation of the cooling and machining enhancement properties of the coolant, are eliminated or greatly minimized. The proposed filtration system actually uses the ability of the aqueous fluid to emulsify unwanted oils to help eliminate them.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A method for separating an oil-in-water emulsion formed from micelles from a liquid system having an oil-in-water emulsion contaminated with a contaminant oil and suspended particulate material, comprising the steps of:

introducing the liquid system containing the oil-in-water emulsion contaminated with the contaminant oil attached to the outside of the micelles into one end of a coiled, tubular composite filter media;

introducing the oil-in-water emulsion, contaminant oil attached to the micelles and suspended particles into the side wall of the filter media;

retaining particulate material greater than a predetermined size within the filter media;

temporarily adsorbing the contaminant oil from the micelles on the fibers of the filter media;

entraining particulate material less than the predetermined size in the adsorbed contaminant oil;

migrating the contaminant oil with the entrained particulate material and transforming them into droplets;

passing the oil-in-water emulsion through the filter media; and trapping and containing the contaminant oil with entrained particle droplets while passing the filtered oil-in-water emulsion on.

2. The method in accordance with claim 1 wherein the trapping and containing step is carried out in a container that retains the trapped contaminant oil with the entrained particulate material and wherein the method includes the step of passing the oil-in-water emulsion from the container.

3. The method in accordance with claim 1 including the step of recovering the oil-in-water emulsion.

4. The method in accordance with claim 1 including the step of reusing the oil-in-water emulsion.

* * * * *